United States Patent [19]

Dilno

[11] 4,392,544
[45] Jul. 12, 1983

[54] CONTROLLER FOR ELECTRIC TRACTION MOTOR

[75] Inventor: Guy L. Dilno, Plainwell, Mich.

[73] Assignee: Clark Equipment Company, Buchanan, Mich.

[21] Appl. No.: 239,284

[22] Filed: Mar. 2, 1981

[51] Int. Cl.³ .............................................. B60L 3/02
[52] U.S. Cl. .............................. 180/273; 200/153 LA
[58] Field of Search ..................... 180/273, 65 R, 315, 180/336; 192/4 A, 9; 200/61.91, 61.89, 153 LA, 153 T

[56] References Cited

U.S. PATENT DOCUMENTS

| | | | |
|---|---|---|---|
| 1,926,419 | 9/1933 | Apple | 200/153 LA |
| 2,267,381 | 12/1941 | Ulinski | 180/65 R |
| 2,957,536 | 10/1960 | Ulinski | 180/65 R |
| 3,179,198 | 4/1965 | Hastings | 180/65 R |
| 3,211,250 | 10/1965 | Wood | 180/65 R |
| 3,507,350 | 4/1970 | Boyajian | 180/273 |
| 3,818,405 | 6/1974 | Randolph et al. | 200/153 LA |
| 3,892,294 | 7/1975 | Nieminski | 180/273 |
| 4,004,665 | 1/1977 | Guhl et al. | 192/4 A |
| 4,085,834 | 4/1978 | Kreitzberg | 192/4 A |

FOREIGN PATENT DOCUMENTS 553658  3/1958  Canada ............................... 180/273

*Primary Examiner*—Joseph F. Peters, Jr.
*Assistant Examiner*—Ross Weaver
*Attorney, Agent, or Firm*—Reising, Ethington, Barnard, Perry, Brooks & Milton

[57] ABSTRACT

A controller (10) for the traction motor of an industrial truck comprises an actuator spool (56) which is axially shiftable by a manual selector member (12) for actuating a plurality of control switches (44,46,48). Detent means (86,78,82,84) hold the spool in forward, reverse or park positions and a return spring (66) urges the spool toward neutral position. The actuator spool (56) is adapted for rotational movement about its axis for automatic release of the detent means and return of the spool to neutral position. A seat occupancy detector (18) is actuated when the driver leaves the seat and imparts rotational movement to the spool which releases the detent means and returns the spool to neutral. The controller is also adapted to provide manual and automatic control of a parking brake (6). When the selector member is in the park position, cam means (184) on the actuator spool actuates a control switch (48) to apply the vehicle brake. When the selector member is in the forward, reverse or neutral position the control switch is operative to release the brake with the driver on the seat; if the driver leaves the seat the spool is rotated and actuates the control switch for applying the parking brake.

8 Claims, 17 Drawing Figures

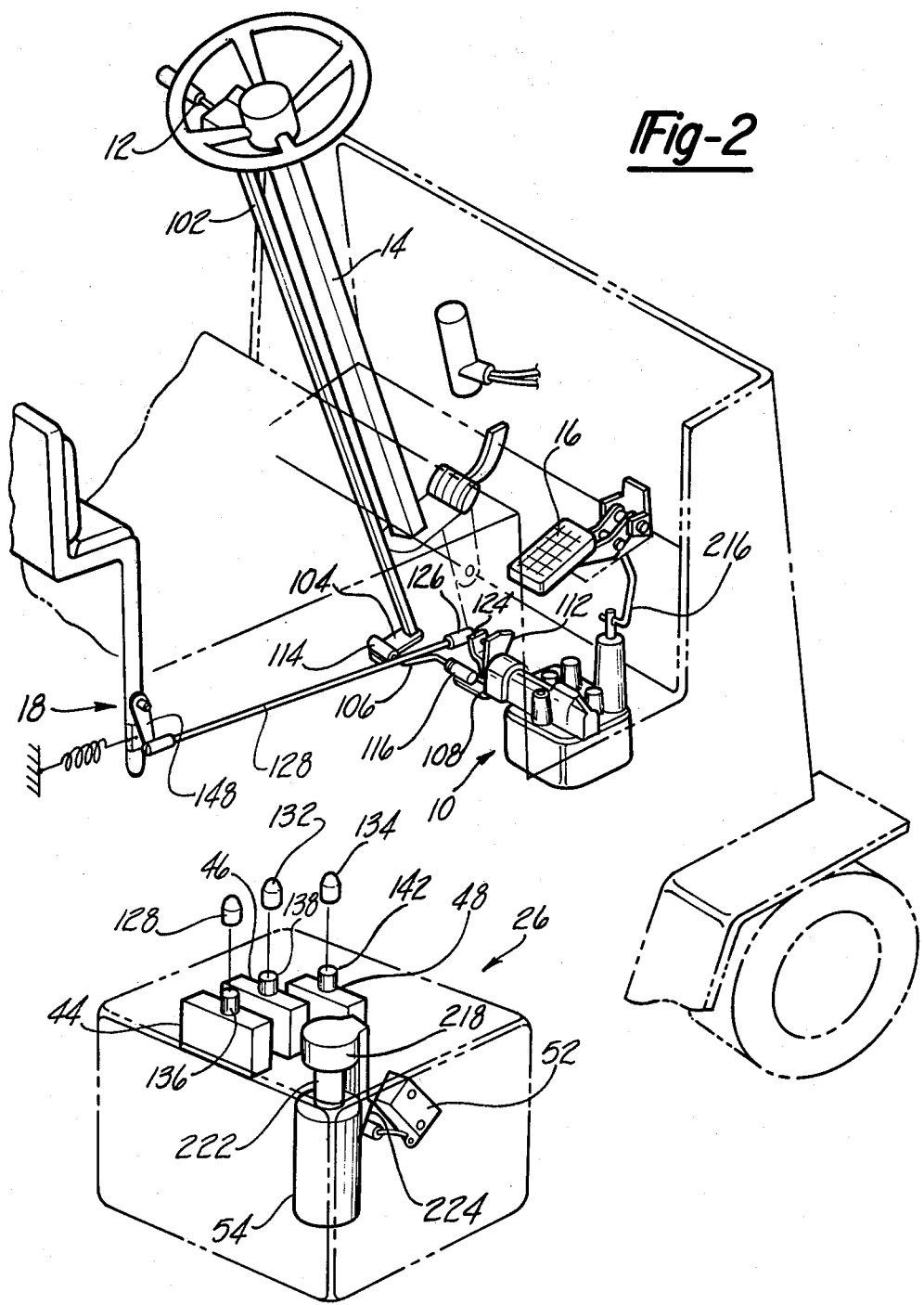

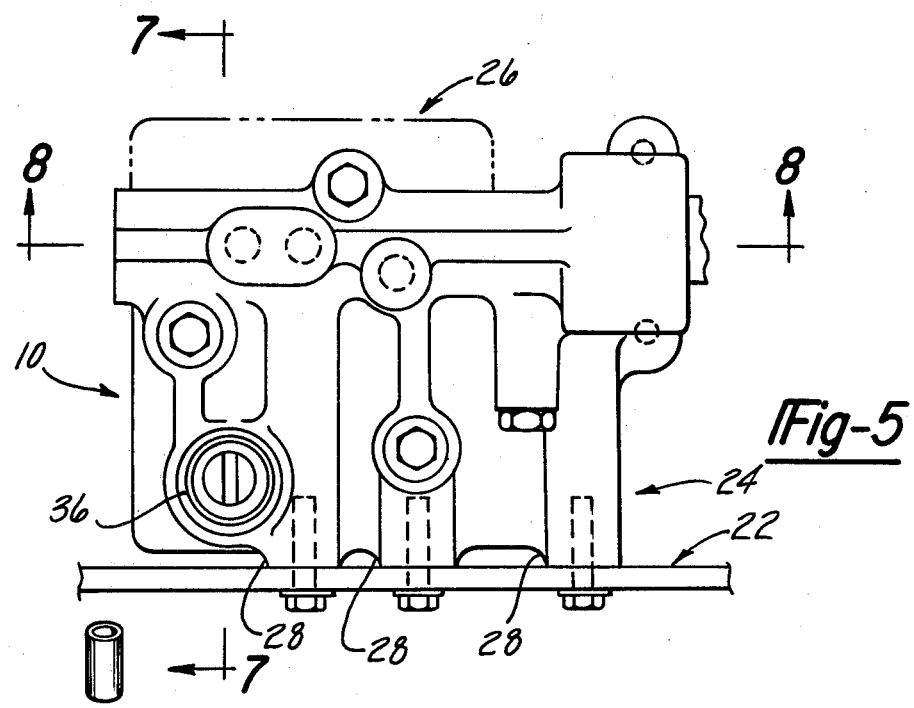
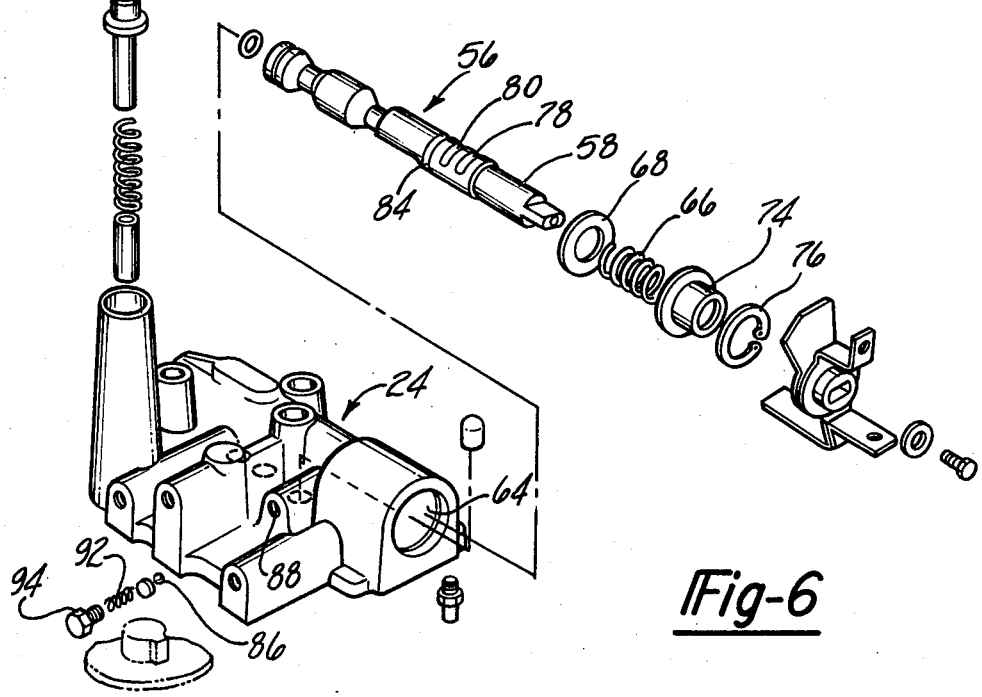

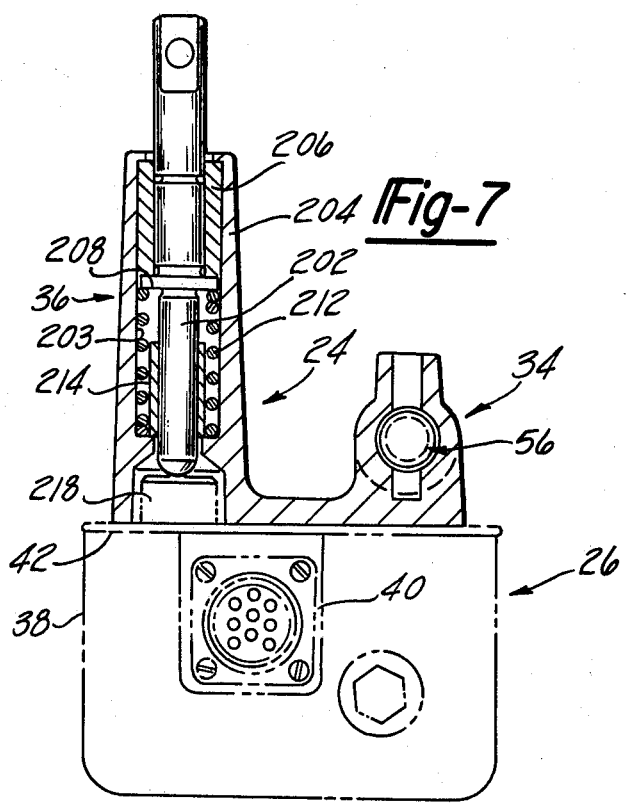
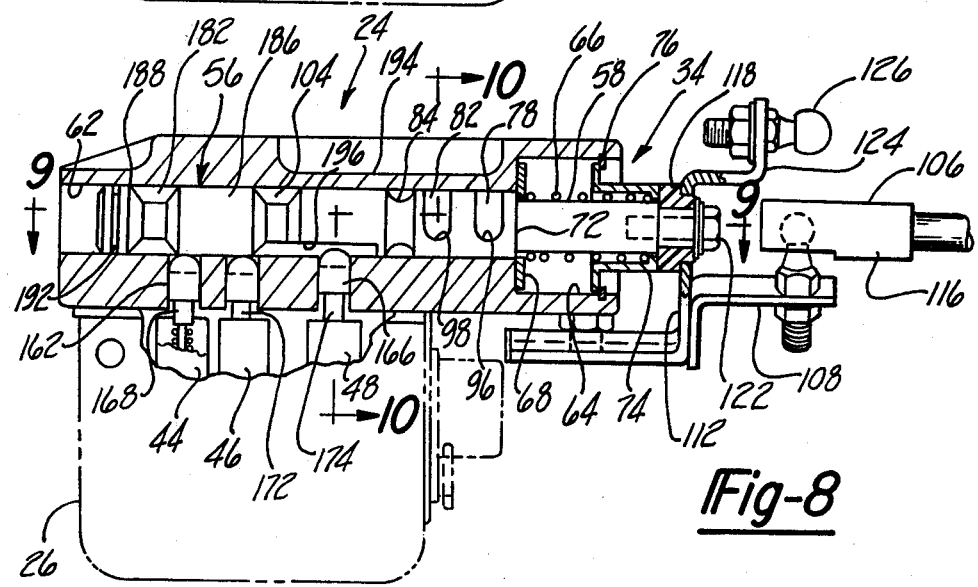

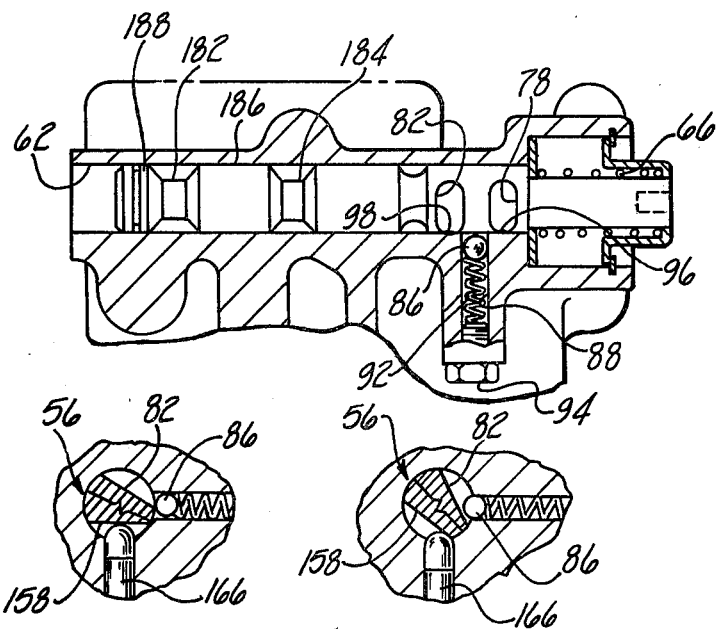
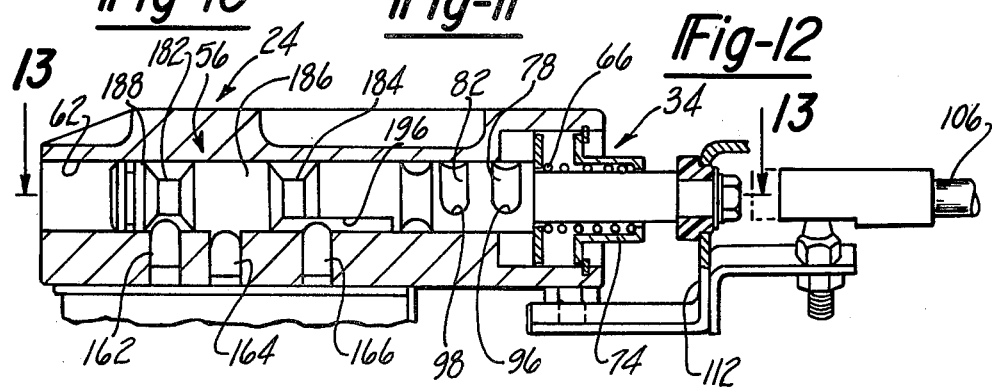
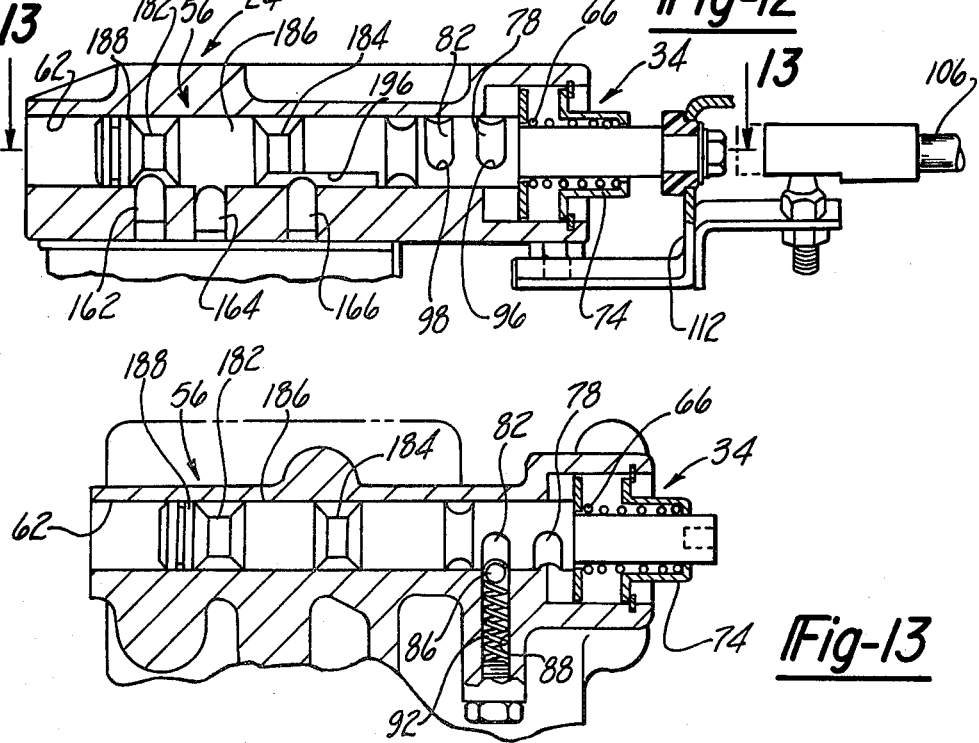

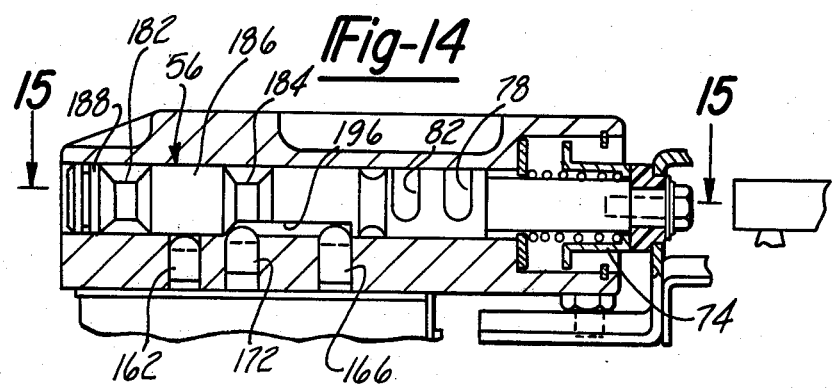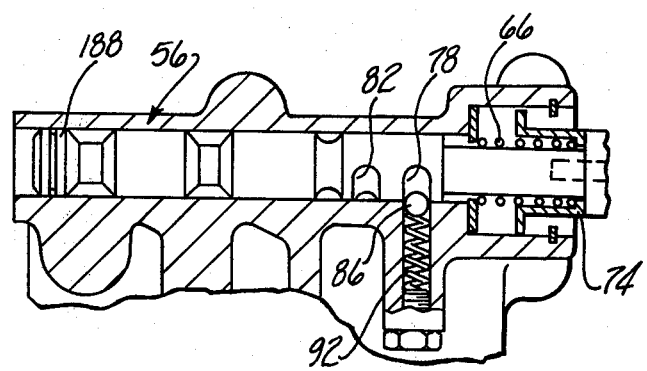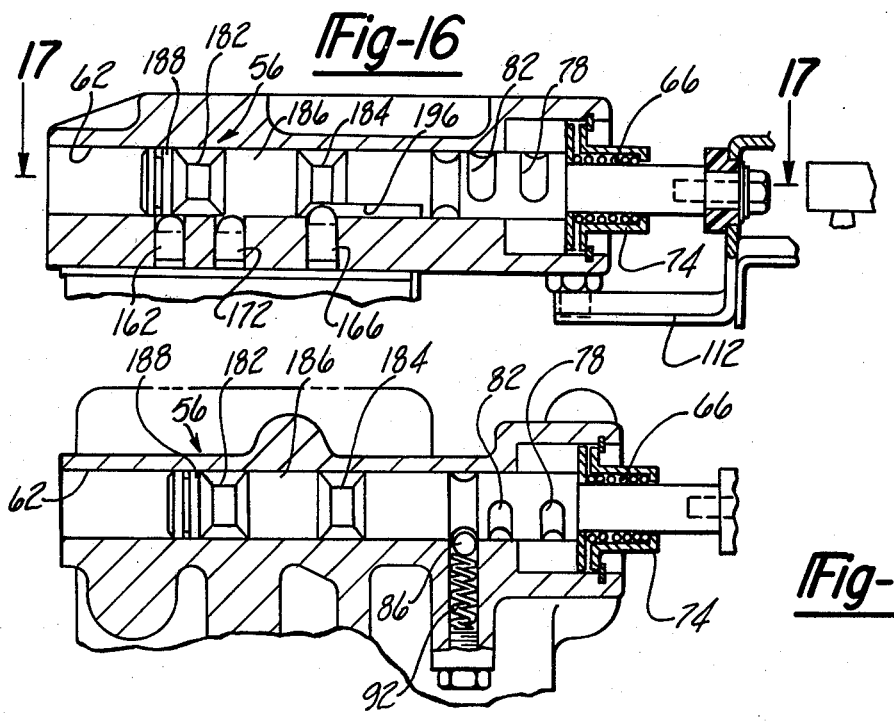

CONTROLLER FOR ELECTRIC TRACTION MOTOR

TECHNICAL FIELD

This invention relates to controllers for self-propelled vehicles; more particularly, it relates to manually operated direction and speed controllers for an electric traction motor of a vehicle.

BACKGROUND ART

In the prior art, industrial trucks such as lift trucks have been provided with controllers actuated by manually operated selector levers for placing the electric traction motor in forward or reverse drive or in neutral or park conditions. In general, such prior art devices utilize rotary cams for actuating a directional control switch, brake control means and speed control means. For example, the Hastings U.S. Pat. No. 3,179,198 discloses a controller for lift trucks with a single, manually operated lever for both direction and speed control. This controller includes a first cam and cam follower for actuating a direction control switch to either forward or reverse position depending upon the direction of motion of the manual control lever. It includes an additional cam and cam follower for controlling the release of the brakes upon movement of the control lever in either direction. It includes another cam, which is driven unidirectionally by the first cam, and has a cam follower which controls the vehicle speed through a series of sequentially actuated switches. The Ulinski U.S. Pat. No. 2,267,381 also discloses a combined direction and speed controller for an electric lift truck. The controller of this patent uses electrical contactors of the drum type.

It is also known in the prior art to provide electric lift trucks with automatic braking when the operator dismounts or leaves his operating station on the vehicle. The Hastings U.S. Pat. No. 3,179,198 discloses a brake system in which the brake is applied when the operator dismounts and removes his foot from a pedal on the floor. A failsafe brake is described in which the brake is spring applied and pressure released. The Guhl et al U.S. Pat. No. 4,004,665 relates to a transmission and parking brake controller. The selector lever covers a range of forward drive speeds and reverse drive speeds together with neutral and park positions. When the selector lever is placed in park position, by a transverse movement of the lever, the fluid pressure to the brake is vented and the brake is spring applied. This system is manually actuated and not responsive to the operator dismounting from the vehicle. The Boyajian U.S. Pat. No. 3,507,350 discloses an electric lift truck with means for preventing vehicle drive unless the operator's seat is occupied. The system of this patent uses a seat switch and relay means for disabling the power circuit unless the seat switch is closed and the drive selector is initially in the neutral position.

A general object of this invention is to provide an improved controller for the traction motor of an electric vehicle and to overcome certain disadvantages of the prior art.

SUMMARY OF THE INVENTION

According to this invention, a controller for a traction motor comprises an actuator spool with cam means and which is axially shiftable in an actuator housing for actuating a plurality of control elements. A manually actuable selector member is coupled with the spool for axial movement thereof for selective actuation of the control elements. Detent means coact between the spool and the housing for holding the spool in certain selected positions. Spring means urge the spool toward a neutral axial position and the selector member is also urged thereby through said linkage toward its neutral position. The detent means may be released by applying an axially directed restoring force on the actuator spool by the selector member.

Automatic release of the detent means is provided by a release means which is actuated by condition responsive means. The condition responsive means, such as driver presence detecting means, is operative under certain conditions, as in the case of the driver dismounting from the seat. This causes release of the detent means and return of the control spool to the neutral position.

The controller of this invention is also adapted to provide manual and automatic control of a parking brake. The cam means on the actuator spool is adapted to actuate a control element for the vehicle parking brake. When the selector member and spool are placed in the park position, the control element is operative to apply the vehicle brake. When the selector member is manually moved to any other position such as forward, reverse or neutral, the control element is actuated and is operative to release the brake. The detent means will hold the control spool in the park position until it is manually moved to another selector position. When the actuator spool is moved to the forward or the reverse position, the detent means will hold it in the selected position subject to automatic release of the detent means and return of the spool to the neutral position automatically under the control of the condition responsive means. When the detent means is released, the spool is returned by the spring means to the neutral position and the brake control element is actuated by the cam means on the actuator spool so that the brake is applied.

According to this invention, the actuator spool is an elongated body having cam means on the surface defining a pair of axially spaced recesses separated by a land. Cam followers, which are adapted to actuate control switches, are movably mounted in the housing for actuation by the cam means. Preferably, the spool is cylindrical and the recesses are annular grooves in the spool. The spool is biased toward a neutral position and adapted for movement in one direction to a forward position and in the other direction to a reverse position. For this purpose, the spool is provided with an operating stem with a bias spring thereon being disposed between a stop member and a retainer member, both of which are slidably mounted on the stem. The bias spring urges the stop member and retainer member in opposite directions into engagement with the housing. To hold the spool in either the forward or reverse position, the detent means comprises a pair of axially spaced recesses in the spool and a spring-loaded ball which is mounted in the housing for engagement with the recesses.

A more complete understanding of this invention may be obtained from the detailed description that follows taken with the accompanying drawings.

DESCRIPTION OF THE DRAWINGS

FIG. 2 is a perspective view of a lift truck which incorporates the controller of the invention;

FIG. 4 is a perspective view showing the controller switches in the switch support member of the housing;

FIG. 5 is a plan view looking down on the controller housing;

FIG. 6 is an exploded view of the actuator assembly including the actuator support member of the housing;

FIG. 7 is a view taken on lines 7—7 of FIG. 5;

FIG. 8 is a view taken on lines 8—8 of FIG. 5 with the actuator spool in neutral position;

FIG. 9 is a view taken on lines 9—9 of FIG. 8;

FIG. 10 is a view taken on lines 10—10 of FIG. 8 showing the actuator spool in the detent-release position;

FIG. 11 is a view similar to FIG. 10 but showing the actuator spool in the detent position;

FIGS. 12 and 13 show the actuator spool in the forward position;

FIGS. 14 and 15 show the actuator spool in the reverse position; and

FIGS. 16 and 17 show the actuator spool in the park position.

BEST MODE FOR CARRYING OUT THE INVENTION

Figure 1:
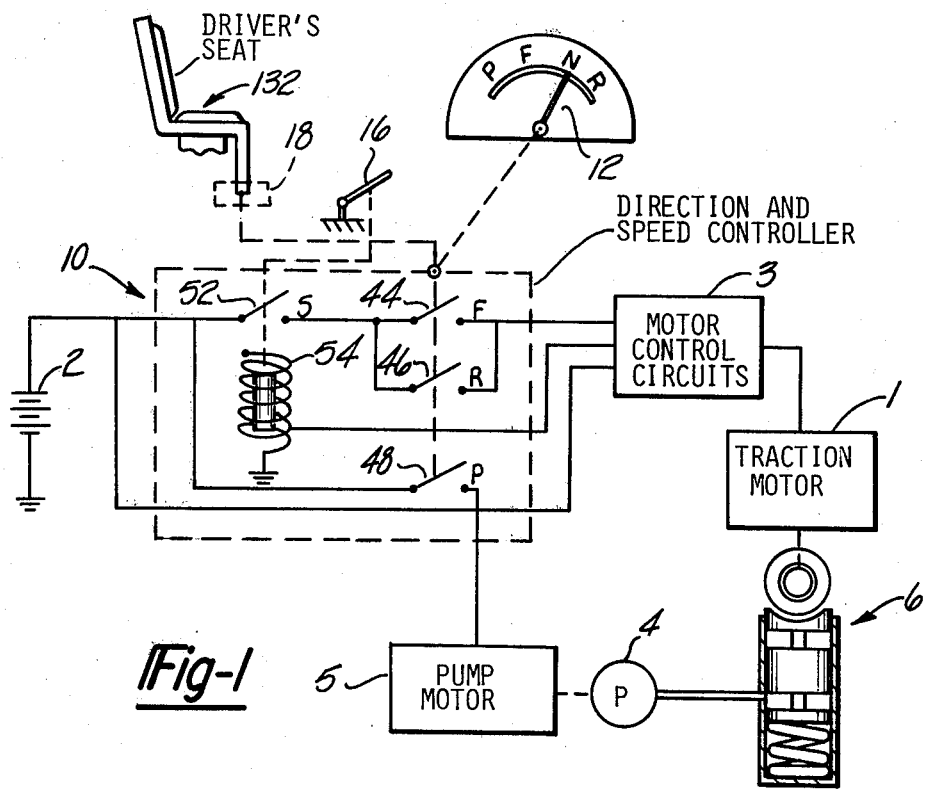
FIG. 1 is a block diagram representing the interconnection of the controller with other components of a vehicle.

Referring now to the drawings, there is shown an illustrative embodiment of the invention in a controller for the electric traction motor of an industrial truck, namely a lift truck. The controller provides both directional and speed control for the traction motor with a manually actuable drive selector member and a separate, manually actuable accelerator pedal. It will be appreciated, as the description proceeds, that the invention may be used in other arrangements and applications.

FIG. 1 is a block diagram representing the interconnection of the controller of this invention with other components of the industrial truck in which it is installed. In general, the truck is provided with an electric traction motor 1 which is energized by a battery 2 under the control of the controller 10 and the motor control circuits 3. The truck is also provided with a hydraulic pump 4 driven by an electric motor 5 which, in turn, is controlled in part by the controller 10. The truck is provided with a parking brake 6 of the failsafe type, i.e. the brake is spring applied and is released by hydraulic pressure from the pump 4.

The controller 10, as shown in FIG. 1, includes a start switch 52 which is connected in series between the battery 2 and the motor control circuits 3. The start switch is actuated by movement of an accelerator pedal 16; the switch is open with the accelerator pedal in its retracted position and the switch is closed during an initial increment of movement when the accelerator pedal is depressed. A speed control member 54 of the inductive type is also coupled with the accelerator pedal 16 and a speed control signal is transmitted from the member 54 to the motor control circuits 3. Direction control for the traction motor is provided by a forward control switch 44 and a reverse control switch 46. The forward and reverse switches 44 and 46 are connected in parallel with each other and in series with the start switch 52 between the battery and the motor control circuits 3. Thus, the traction motor 1 will be energized through the motor control circuits 3 when the start switch 52 is closed with either the forward control switch 44 or the reverse control switch 46 closed. The controller 10 also includes a brake control switch 48 which is serially connected between the battery 2 and the pump motor 5. Accordingly, when the brake control switch 48 is open the motor 5 is turned off and the pressure to the brake 6 is cut off and the brake is applied by the brake spring. When the brake control switch 48 is closed the pump motor is turned on and the pressure to the brake 6 is effective to release the brake. The forward control switch 44, reverse control switch 46 and the brake control switch 48 are selectively actuated by a manual selector lever 12 which may be placed in park position, forward position, neutral position or reverse position. When the selector lever is in the neutral position, as depicted in FIG. 1, both the forward switch 44 and the reverse switch 46 are open and hence, the traction motor is deenergized. When the selector lever 12 is in the forward position, the forward switch 44 is closed and the reverse switch 46 is open and hence, the traction motor will be energized when the start switch 52 is closed. Similarly, when the selector member 12 is in the reverse position, the reverse control switch 46 is closed and the forward control switch 44 is open and hence the motor will be energized when the start switch 52 is closed. When the selector member 12 is in the park position, the forward control switch 44 and the reverse control switch 46 are open and the brake control switch 48 is open. This deenergizes the traction motor 1 and the pump motor 5 and hence the parking brake 6 is applied.

The selective actuation of the forward control switch 44, reverse control switch 46 and park control switch 48 is also controlled by a condition responsive detector, namely, a driver's seat occupancy detector 18. The occupancy detector 18 is operative, when the selector lever 12 is in the neutral position to cause the brake control switch to turn off which causes the parking brake 6 to be applied when the driver dismounts from the seat. Also, the detector 18 is operative, when the selector lever 12 is in either the forward or reverse position, in response to the driver dismounting from the seat 132, to cause the forward control switch 44 and the reverse control switch 46 to open and deenergize the traction motor and to cause the brake control switch 48 to open which causes the brake 6 to be applied. The controller 10 will be described in detail presently along with the interconnection thereof with the selector lever 12, the accelerator pedal 16 and the seat occupancy detector 18.

FIG. 2 depicts a lift truck with the controller 10 of this invention installed thereon. As described above, the controller 10 is adapted to provide directional control for the electric traction motor. For this purpose, the drive selector lever 12 is coupled with the controller and is mounted on the steering column 14 of the vehicle for operation by the driver. The controller 10 is also adapted to provide starting and speed control of the traction motor and for this purpose it is coupled with the accelerator pedal 16. The controller 10 is also adapted to control the parking brake in accordance with the state of the seat occupancy detector 18.

As shown in FIG. 5, the controller 10 is mounted on a front panel 22 of the lift truck. The controller comprises a housing including an actuator support member 24 and a depending switch support member 26. The actuator support member 24 is a unitary body, a metal casting, having a set of three mounting bosses 28 which receive respective mounting bolts 30 for supporting the controller on the panel 22. The actuator support member 24 includes a passage 62 which supports a direction control actuator 34 (see FIGS. 7 and 8) and includes a passage 203 which extends orthogonally to passage 62 and supports a speed control actuator 36 (see FIG. 7), both of which will be described in detail subsequently.

The support member 26 of the controller housing comprises a rectangular box 38 and a cover plate 42. A set of control switches are mounted within the support member 26, as best shown in FIG. 4. The set includes forward control switch 44, reverse control switch 46, and brake control switch 48. The start control switch 52 is mounted on the side wall of the switch support member 26. Also, the speed control member 54 is mounted within the support member 26. An electrical connector 40 is mounted in the wall of support member 38 to provide for connection of the switches and the speed control member with external circuits. The manner in which the control switches and the speed control member are actuated by the direction control actuator 34 and the speed control actuator 36 will be described in detail subsequently.

The direction control actuator 34 will now be described in detail with reference to FIGS. 6 and 8. The direction control actuator comprises a cylindrical actuator spool 56 having an operating stem 58 at one end and being slidably mounted in a cylindrical passage 62 in the support member 24. The operating stem 58 extends through a cylindrical chamber 64 to a point beyond the end of the support member 24. The actuator spool 56 is biased toward a reference or neutral position which is shown in FIG. 8. For this purpose, a coil spring 66 is disposed in the chamber 64. A stop washer 68 is disposed in the chamber 64 over the stem 58 and engages a shoulder 72 at the juncture of the stem and the spool 56. The inner end of the spring 66 is seated against the stop washer 68 and the spring 66 is retained at its outer end by a cup-shaped retainer 74. The retainer 74 is held in the support member 24 by a snap ring 76. The actuator spool 56 may be moved in either direction from the neutral position; when it is moved leftwardly (as viewed in FIG. 8) the retainer member 74 is moved away from the snap ring 76 and the spring 66 is compressed. When it is moved rightwardly, the stop washer 58 is moved away from the inner end wall of the cavity 64 and the spring 66 is compressed.

The actuator spool 56 is adapted to be moved leftwardly from the neutral position (shown in FIG. 8) to a first position which is herein called the reverse position. It may be moved rightwardly to a second position, herein called the forward position, and to a third position, herein called the park position. In order to hold the actuator spool 56 in the reverse, forward and park positions, a detent mechanism is provided. The detent mechanism includes a partial annular groove 78 for the reverse position, a partial annular groove 82 for the forward position and a full annular groove 84 for the park position. The detent mechanism also includes a detent element or ball 86 (see FIGS. 6 and 9) which is disposed in a transverse passage 88 in the support member 24. The detent ball 86 is biased toward engagement with the actuator spool by a compression spring 92 which is held in place by a screw 94.

The detent mechanism is adapted to hold the actuator spool 56 in the forward, reverse or park position against the return force exerted by the bias spring 66. However, the detent mechanism will be released by a restoring force on the actuator spool which will cause the detent ball to be cammed outwardly against the spring by the lip of the detent groove in which it is seated. Such a restoring force may be applied by the manual selector lever 12 through an arrangement which will be described subsequently. The detent mechanism may also be released when the actuator spool is in the forward or reverse position by a detent release means. The detent release means comprises a cam face 96 at the end of the partial annular groove 78 and a cam face 98 at the end of the partial annular groove 82. The actuator spool 56 is supported for rotation about its axis in the passage 62 and rotational motion is imparted thereto under certain conditions by the seat condition detector means 18 which will be described subsequently. When the spool 56 is in a detent position, i.e. the detent ball 86 is seated in the detent groove 82, as shown in FIG. 13, rotation of the spool in a clockwise direction (as viewed from the right hand end in FIG. 13) to a detent-release position will cause the ball to engage the cam face 98 and the ball will ride up out of the groove and the bias spring 66 will return the spool 56 to the neutral position which is shown in FIGS. 8 and 9. Also, when the spool 56 is in the other detent position, i.e. the detent ball 86 is seated in the detent groove 78, as shown in FIG. 15, rotational motion of the spool in a clockwise direction will cause the ball to engage the cam face 96 and be lifted out of the groove. This will allow the bias spring 66 to return the actuator spool to the neutral position. However, when the detent ball 86 is seated in the annular groove 84 of the park position, rotation of the actuator spool 56 will not release the detent means because the groove extends all the way around the spool. The detent means is released in park position only by the restoring force applied manually through the selector lever.

The arrangement for positioning the actuator spool will be described with reference to FIG. 2. The actuator spool 56 is shifted axially in the passage 62 to the neutral, reverse, forward or park position by the manual selector lever 12. For this purpose, the lever 12 is connected with the upper end of a rod 102 which extends along the steering column 14 and has a crank arm 104 connected to its lower end. A shift rod 106 extends from the outer end of the crank arm 104 to a bracket 108 on an actuator coupling or plate 112. It is noted that the crank arm 104 is joined to the shift rod 106 by a ball and socket connector 114 to provide for universal action therebetween. Similarly, the shift rod 106 is connected with the bracket 108 by a ball and socket connector 116. The actuator plate 112 is mounted on the stem 58 by an adaptor 118 seated on a squared shank of the stem and held in place by a bolt 112 (see FIG. 8). When the selector lever is rotated counterclockwise from the neutral position the shift rod 106 pushes the actuator spool 56 leftwardly (as viewed in FIG. 8) to the reverse position. When the selector lever is rotated clockwise from the neutral position, the shift rod 106 pulls the actuator spool rightwardly (as viewed in FIG. 8) to the forward position and to the park position, successively.

In order to impart rotational motion to the actuator spool 56, the actuator plate 112 is provided with a crank arm 124. The crank arm 124 is connected through a ball and socket connector 126 and a push-pull rod 128 to the seat condition or occupancy detector 18. The details of the seat occupancy detector 18 will be described presently.

Figure 3:
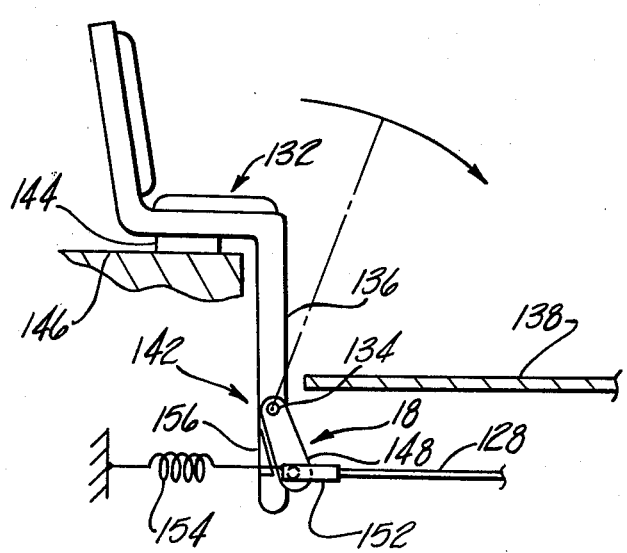
FIG. 3 shows a seat occupancy detector.

For the purpose of determining whether the driver is properly situated on the vehicle for operation thereof, the seat condition detector 18 is provided. As shown in FIG. 3, the seat condition detector coacts with the seat 132 and is operative to assume one condition when the seat is occupied and another condition when the seat is unoccupied. The seat 132 is pivotally mounted on the vehicle frame by a shaft 134. The shaft extends transversely through the front leg-member 136 at a point below the vehicle floorboard 138. The seat 132 is spring biased toward a forward-tilt position by a torsion spring 142 which is disposed around the shaft 134. When the seat is occupied by the driver, the driver's weight causes the seat to pivot counterclockwise about the shaft 134 so that the rear leg-member 144 is seated on the vehicle body member 146. The seat is illustrated in this attitude in FIG. 3. The seat condition detector comprises a lever 148 which is pivotally mounted at its upper end on the shaft 134. The push-pull rod 128 is connected with the lower end of the lever 148 by a ball and socket connector 152. The lever 148 is yieldably urged or biased toward rotation about the shaft 134 in the clockwise direction by an extension spring 154 connected between the lever and the vehicle body. The rotation of the lever 148 in the clockwise direction is limited by a stop member 156 on the lower part of the leg-member 136 of the seat. When the seat 132 is occupied and hence in the position shown in FIG. 3, the lever 148 is pushed by the stop member 156 in a counterclockwise direction to an extended position. When the lever 148 is in the extended position, the push-pull rod 128 rotates the actuator plate 112 in a counterclockwise direction, as viewed from the right hand end in FIG. 8 and the spool 56 is placed in its detent position. When the driver dismounts from the seat 132, the torsion spring 142 causes the seat to tilt forward and hence the stop member 156 moves rearwardly. This allows the extension spring 154 to contract and rotate the lever 148 in the clockwise direction to its retracted position. Accordingly, the actuator plate 112 is rotated in a counterclockwise direction, as viewed from the right hand end in FIG. 4, and the spool 56 moves to its detent-release position. It is noted that this arrangement provides a lost motion connection between the lever 148 and the leg-member 136 of the seat so that the seat may be tilted to an extreme forward position for access to the space beneath the seat without interfering with the seat occupancy detector. In summary, when the seat 132 is occupied, the detector 18 causes the actuator plate 124 to rotate the actuator spool 56 to the detent position. When the seat is unoccupied, the detector 18 causes the actuator plate 122 to rotate the actuator spool to the release position.

The actuator spool 56 includes cam means which are operative to actuate the forward control switch 44, the reverse control switch 46 and the brake control switch 48 in a selective manner. For the purpose of actuating the switches, the cam means on the actuator spool are coupled with the respective switches 44, 46 and 48 by respective cam followers, namely, forward cam follower 162, reverse cam follower 164, and brake cam follower 166. Each of the cam followers is a piston with an arcuate follower surface for engagement with the cam means on the actuator spool 56. Each cam follower is slidably mounted in a respective passage which extends from the lower surface of the support member 24 to the passage 62 containing the actuator spool 56. The rear end of each of the cam followers is adapted to abut the switch plungers 168, 172 and 174, respectively, of the switches 44, 46 and 48. The switch plungers are spring loaded within the switch housing and are spring biased to an extended position as indicated in FIG. 4. The spring force imparted by the switch plungers is sufficient to maintain the respective cam followers in engagement with the cam means on the actuator spool 56. The forward control switch 44 and the reverse control switch 48 are normally closed switches, i.e. with the respective switch plungers 168 and 172 in the extended position, the switches are in the on condition. The brake control switch 48 is a normally open switch, i.e. with the switch plunger 174 in the extended position the switch is in the off condition.

The cam means on the actuator spool 56 for selective actuation of the switches 44, 46 and 48 are comprised of axially spaced hilltops and valleys with axially extending ramps therebetween. In particular, the actuator spool 56 comprises a first recess in the form of an annular groove 182 adjacent the left end of the spool (see FIG. 8). A second recess in the form of an annular groove 184 is disposed axially thereof with a land 186 therebetween. A second land 188 is provided on the spool at the left end thereof and is provided with a seal ring 192. Also, a third land 194 is provided on the spool between the annular groove 184 and the annular groove 84. The valleys of the grooves 182 and 184 are joined with the tops of the lands 188, 186 and 194 by respective axially extending ramps so that the profile of an axial section of the actuator spool constitutes a cam surface for coaction with the cam followers 162, 164 and 166. An axially extending flat 196 is provided on the actuator spool 56 and extends through the valley of the annular groove 184 to a point adjacent the park detent groove 84 for purposes to be described below.

As described above, the actuator spool 56 is rotated between a detent position and a detent-release position by the seat occupancy detector 18. When the driver leaves the seat of the vehicle, it is desirable to apply the parking brake regardless of the position of the selector lever 12. For this purpose, the actuator spool 56, as described above, includes cam means which are effective to actuate the brake control switch 48 so that the brake is applied when the driver is off the seat. Consider first the position of the actuator spool 56 with the selector lever in the forward position and the driver on the seat. As shown in FIG. 11, the actuator spool is in the forward position and the detent ball 86 is seated in the forward detent groove 82. With the driver on the seat, the spool 56 is rotated so that the flat 158 thereon cams the follower 166 to its downward position which maintains the pump switch 48 closed. Accordingly, in this condition, the parking brake is released. When the driver leaves the seat with the selector lever 12 in either the forward position or the reverse position the actuator spool moves to the position shown in FIG. 10 (the neutral position, shown in FIGS. 8 and 9). This obtains because rotation of the actuator spool 56 to the detent-release position allows the return spring 66 to move the spool to the neutral position where the detent ball 86 engages the land between the forward detent groove 82 and the reverse detent groove 78. In this rotative position of the spool (shown in FIG. 10) the cam follower of the pump switch 48 is in its upper position and the pump switch is turned off allowing the parking brake to be applied.

The speed control actuator 36 will now be described in detail with references to FIGS. 2, 4 and 7. The speed control actuator comprises an actuator plunger 202 which is slidably mounted in a passage 203 in a tower 204 in the actuator support member 24. The plunger 202 is supported within the passage by a sleeve 206 and includes an annular flange 208 near its mid-section. The sleeve 206 is retained by an inturned flange on the upper end of the tower 204. A spring 212 is seated at its lower end on the bottom of the passage and at its upper end on the annular flange 208. Thus, the plunger 202 is normally biased upwardly so that the flange 208 is seated against the lower end of the sleeve 206. A stop sleeve 214 surrounds the lower end of the plunger and limits the downward motion thereof. The upper end of the plunger 202 is connected through a push rod 216 to the accelerator pedal 16. The lower end of the plunger 202 engages the head 218 of a speed control plunger 222 of the speed control member 54. The speed control plunger 222 is spring biased toward its extended or upper position and is displaced downwardly by the downward motion of the actuator plunger 202. The head 218 carries an actuator cam 224 which is adapted to close the start switch 52 during the initial increment of motion of the accelerator pedal 16. The speed control member 54, of known design, is adapted to produce a speed control signal for the motor control circuits in accordance with the extent of displacement of the accelerator pedal.

The operation of the controller will now be described with particular reference to FIGS. 1, 2 and 8 through 17. With the driver in place on the seat 132, the lift truck may be operated with the selector member 12 in the park, forward, neutral or reverse position. With the selector lever in the neutral position, the actuator spool 56 is in the neutral position, as shown in FIG. 8 and 9. Thus, the cam followers 162 and 164 are seated on the land 186 and the forward control switch 44 and the reverse control switch 46 are turned off. Also, the cam follower 166 is held in its downward position by the flat 158 and hence pump 4 is turned on and the parking brake 6 is released. With the pump turned on, the lift functions of the lift truck are operational. If the driver dismounts from the seat, the seat occupancy detector 18 rotates the actuator spool to the detent-release position, as shown in FIG. 10, and the cam follower 166 moves to its upper position and the pump is turned off and the parking brake is applied.

With the driver on the seat 132 and the selector member 12 in the forward position, the actuator spool 56 is in the position shown in FIGS. 12 and 13. The spool is held in this position by the detent ball 86 which is seated in the detent groove 82. With the spool in the forward position, the cam follower 164 is seated on the land 186 and the reverse control switch 46 is turned off. In this condition, the cam follower 162 is seated in the valley 182 and the forward control switch 44 is turned on. Also, in this condition, the cam follower 166 is seated on the flat 196 and, with the actuator spool 56 in the detent position the pump control switch 48 is turned on and the parking brake is released. Thus, the driver may operate the vehicle in the forward mode by depressing the accelerator pedal 16. The first increment of motion of the accelerator pedal closes the start switch 52 and energizes the traction motor. Depression of the accelerator pedal produces a speed signal from the speed control member 36 according to the extent of pedal depression. If the driver brings the vehicle to a stop and dismounts from the seat, the actuator spool 56 will automatically move to the neutral position. When the driver dismounts, the seat occupancy detector 18 rotates the actuator spool 56 to its detent-release position in which the detent ball 86 rides out of the detent groove 82. This allows the return spring 66 to push the actuator spool 56 leftwardly, as viewed in FIG. 13, until the detent ball 86 is seated between the grooves 82 and 78. This positions the actuator spool in neutral, as shown in FIGS. 8 and 9, and the traction motor is turned off and the parking brake is applied. The selector member 12 is also returned to neutral by the force of the return spring 66 which acts through the spool 56 and the linkage is connected with the selector member.

With the driver situated on the seat 132 and the selector member 12 in the reverse position, the actuator spool 56 is positioned as shown in FIGS. 14 and 15. In this position, the cam follower 162 is seated on the land 186 and is held in its lower position so that the forward control switch 44 is turned off. The cam follower 172 is seated in the valley 184 in its upper position and the reverse control switch 46 is turned on. The cam follower 166 engages the flat 196 and is held in its lower position so that the pump control switch 48 is turned on. The actuator spool 56 is held in the reverse position by the detent ball 86 which is seated in the detent groove 78. With the actuator spool in the reverse position, as described, the driver may operate the accelerator 16 for speed control in the same manner as described for the forward mode of operation. Also when the vehicle is brought to a stop and the driver dismounts from the seat, the actuator spool 56 will automatically return to the neutral position in the same manner as described for the forward mode of operation.

With the driver situated on the seat and the selector member 12 in the park position, the actuator spool 56 is positioned as shown in FIGS. 16 and 17. The cam follower 162 is seated against the land 188 and thus is held in its lower position with the forward control switch 44 turned off. The cam follower 172 is seated against the land 186 and is held in its lower position with the reverse control switch 46 turned off. The cam follower 166 is seated in the annular groove 184 and is in its upper position so that the brake control switch 48 is turned off. Thus, the traction motor is deenergized and the parking brake is applied. In this position of the actuator spool 56, the cam follower 166 remains in its upper position with the brake control switch turned off regardless of whether the spool 56 is in the detent position or the detent-release position, as determined by the seat occupancy detector 18.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. A controller for use in a vehicle having an electric traction motor with forward and reverse drive means,
   a controller housing,
   control means adapted to be actuated for selecting forward and reverse drive,
   an actuator spool mounted in said housing and adapted for axial movement to neutral, forward and reverse positions,
   cam means on said spool for selectively actuating said control means,
   a manually actuable selector member movable to neutral, forward or reverse positions and being operatively coupled with said actuator spool for axial movement thereof to corresponding positions for selective actuation of the control means by said cam means, detent means coacting between said spool and said housing for holding said spool in said forward or reverse position, bias means continuously urging said spool toward said neutral position, release means for releasing said detent means whereby said spool and said selector member are returned to said neutral position by said bias means, and condition responsive means for actuating said release means.

2. The invention as defined in claim 1 wherein, said vehicle has a parking brake and wherein said actuator spool is axially movable to a park position and said manually actuable selector is movable to a park position, a control element adapted to be actuated for applying said brake, said cam means coacting with said control element to apply said brake when the drive selector member is in the park position.

3. The invention as defined in claim 2 wherein, said cam means coacts with said control element to apply said brake when said selector member is in the neutral position and said condition responsive member actuates said release means.

4. The invention as defined in claim 2 wherein, said detent means also coacts between said spool and said housing for holding said spool in said park position, said detent means being effective to hold said spool in said park position regardless of the actuation of the release means.

5. The invention as defined in claim 1 wherein, said vehicle includes a driver's station, said condition responsive means includes a detector member adapted for movement when the driver of the vehicle dismounts from the driver's station, said detector member being coupled with said release means for actuation thereof when the driver dismounts from said station.

6. A controller for use in a vehicle having a motor with forward and reverse drive means and a parking brake, an actuator member supported for movement to neutral, forward or reverse positions, first and second control elements adapted to be selectively actuated by said actuator member for selecting forward or reverse drive when the actuator member is in said forward or reverse position, holding means for holding said actuator member in said forward or reverse position, restoring means for moving said actuator member to said neutral position, condition responsive means coupled with the holding means for releasing it in response to a predetermined condition, a driver's station to be occupied by the driver during vehicle operation, said condition responsive means comprising a detector member adapted for movement when the driver dismounts from the driver's station, said detector member being coupled with said actuator member for releasing the holding means whereby the restoring means moves the actuator member to said neutral position when the driver dismounts from said station, said actuator member being supported for movement to a park position, and a third control element adapted to be actuated by said actuator member for applying said parking brake when said actuator member is in said park position.

7. The invention as defined in claim 6 wherein, said actuator member coacts with said third control element to apply said parking brake when said actuator member is in the neutral position and said actuator is released by said holding means in response to the driver dismounting from said station.

8. The invention as defined in claim 1 wherein, said actuator spool comprises an operating stem at one end thereof extending through a chamber in said housing, said bias means comprising a stop member slidably mounted on said stem and disposed in said chamber and adapted to engage the housing at one end of said chamber, a retainer member slidably mounted on said stem at the outer end thereof and being adapted to engage said housing at the other end of said chamber, a spring disposed between said stop member and said retainer member, whereby said actuator spool is biased by said spring toward said neutral position and is adapted for movement in either direction from the neutral position against the resistance of said spring.

* * * * *